Dec. 11, 1923.  1,476,893
P. B. JAGGER
APPARATUS FOR THE PRODUCTION OF FISH PRODUCTS
Filed Oct. 4, 1920  4 Sheets-Sheet 2
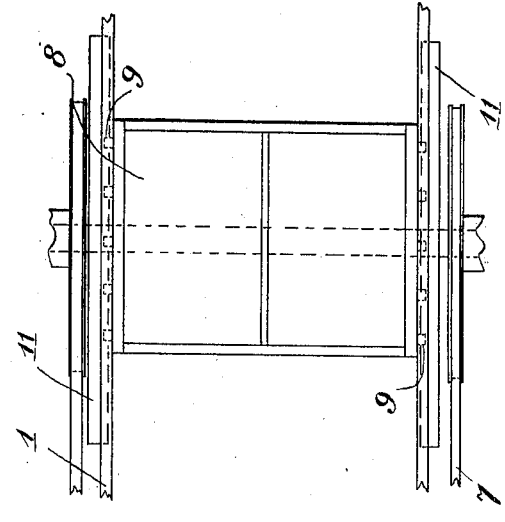
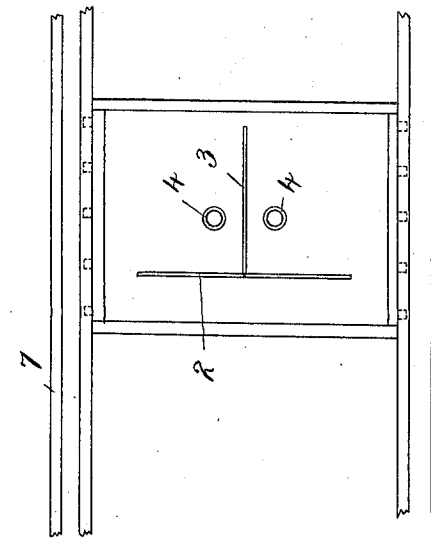
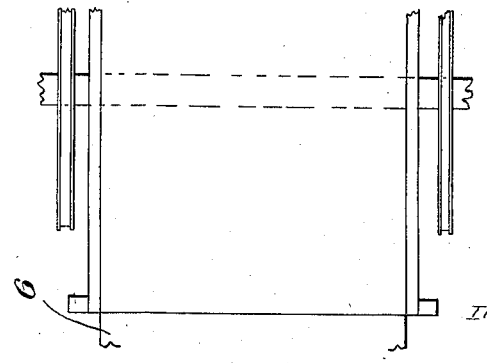
INVENTOR
PETER BURD JAGGER
ATTORNEY Dec. 11, 1923.  
P. B. JAGGER  
1,476,893  
APPARATUS FOR THE PRODUCTION OF FISH PRODUCTS  
Filed Oct. 4, 1920  4 Sheets-Sheet 3

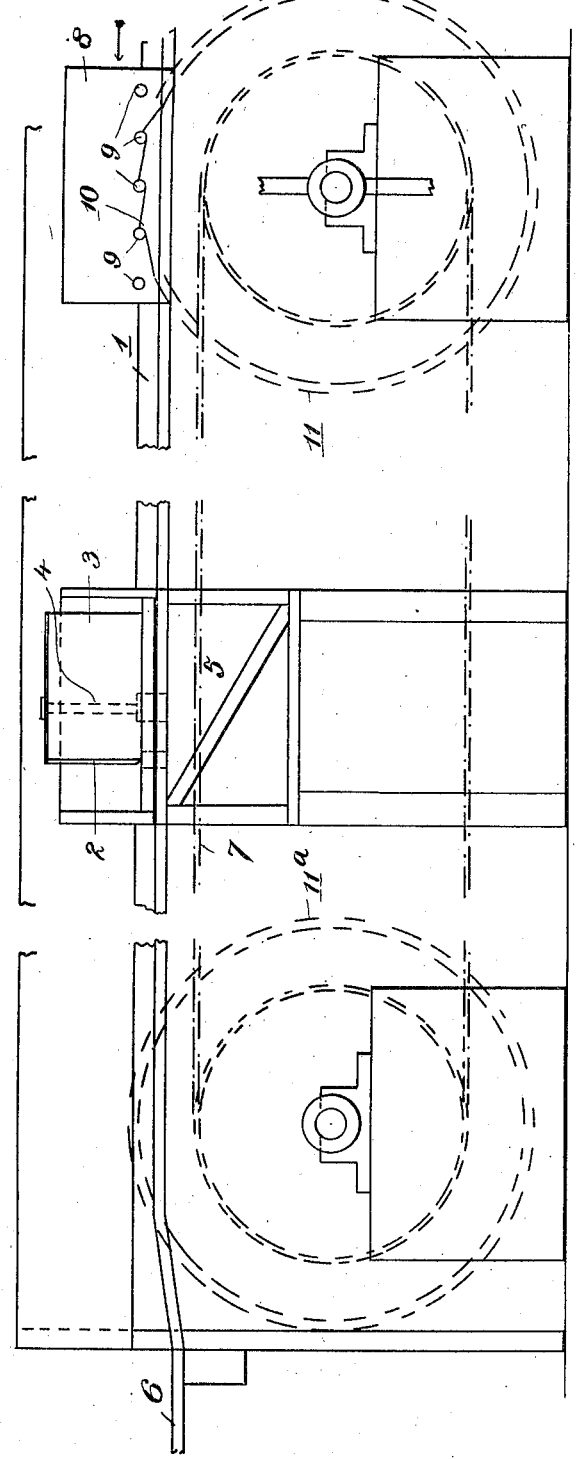

INVENTOR  
PETER BURD JAGGER  
By H.C. Heide  
ATTORNEY.

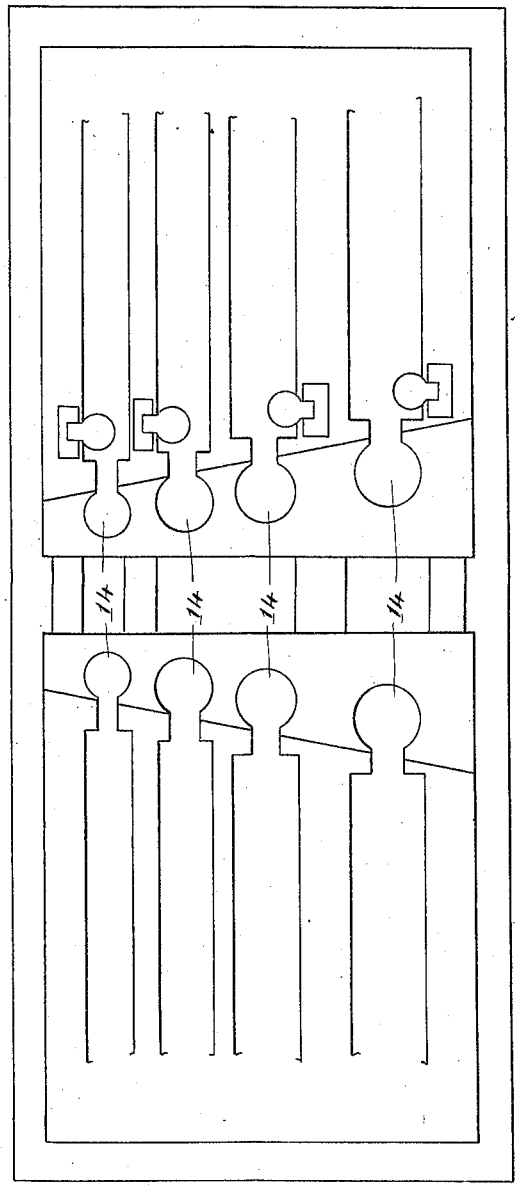

Patented Dec. 11, 1923.

1,476,893

UNITED STATES PATENT OFFICE.

PETER BURD JAGGER, OF LONDON, ENGLAND.

APPARATUS FOR THE PRODUCTION OF FISH PRODUCTS.

Application filed October 4, 1920. Serial No. 414,669.

*To all whom it may concern:*

Be it known that I, PETER BURD JAGGER, a subject of the King of Great Britain, residing at London, England, have invented certain new and useful Improvements in Apparatus for the Production of Fish Products, of which the following is a specification.

The present invention relates mainly to the preparation of dry and stable meal-like or flour-like products from the rejected portions of soft-scaled or soft-skinned fish as, for example, cod and ling, but incidental to the method are aspects in which the meal-like condition is not realized. Incidental to the present method are aspects in which portions unsuited for human food yield food for the lower animals, and also manure.

The rejected portions or "offals" of such fish as cod or ling which are treated to produce human food by the herein described process, are the head, the skin, and the vertebral parts to which in the process of dressing for producing fillets and dried fish, a considerable proportion of the muscular mass adheres. The head is trimmed by removing or punching out the eyes, jaws and teeth, and also when desirable or necessary removing the gills and mouth, after which, or incident to which the head should be opened or split so as to lie flat.

The parts thus prepared are dried by a gentle and slow heat after which they are ground separately or together to a meal or flour, this meal being used in the production of bread porridge or the like. The different grades or qualities of flour or meal are conveniently kept separate in manufacture so that food value may be adjusted by suitable admixture. The vertebral portion gives abundant phosphates and the various grades of skin differ among themselves in this respect. The opened or split heads trimmed as described may be marketed separately as a kind of fish steak.

The gills, eyes and rejects from the head may be dried and ground to a "bran" grade and sold as a food for the lower (non-human) animals, and may be compressed for export.

The stomach, internal organs, blood and like are ordinarily treated for use as manure.

Before butchering or dividing it is very desirable to remove the blood by for example, washing in known manner.

In trimming or "butchering" certain conveniences and facilities in combination are to be regarded as a part of the present invention as for example a travelling table with control for motion and rest, eye punches with control, whether automatic or manual, for accommodating varying interocular distances, positions for the various classes and automatic cast-offs into receptacles or shoots. Alternatively travelling bands may carry the products.

The drying device which is generally suitable is one in which a stream of warm gaseous matter, which may conveniently be the draft and products of combustion from wood or other vegetable fuel circulates through or among grills, studded plates or like in which the fish pieces are placed, but any type of drying appliance as a vacuum cupboard dryer, or a cylindro-spiral dryer may be employed. An occasional and controlled injection into the drying system of creosote like or other vapour or spray is often expedient; and the aromatic flavouring as nutmeg, for example; already mentioned, may be introduced in this way. The aromatic flavouring whether of the creosote or nutmeg class tends much to the conservation and non-rancidifying of the oil of the fish, but it will be noted that the parts hitherto mentioned contain but little oil.

When necessary the oil may be partly removed by known means, as for example continuous or periodic extraction with appropriate solvents.

It may be emphasized that the skins and other parts should be thoroughly washed and cleaned before drying and grinding; any usual antiseptic treatment of a non-poisonous kind, and as adapted for food products, as for example, salt, boracic acid, aromatics or like may be associated with the washing if expedient.

The ground flour or meal whether fine or coarse when once thoroughly dried keeps well—even if exposed to the air and without antiseptics. Nevertheless hermetic sealing and the use of non-aromatic or aromatic antiseptics may be resorted to, and are desirable in certain cases.

The desirability of establishing the milling and other plant for the so-called offals in close proximity to the localities where large amount of filleting and dried goods trade is carried on, is obvious. The curing or drying should be as immediately close to the filleting establishment as possible, and several drying stations may supply one milling centre: the dry material being easy to transport without risk or damage; hence such transport is merely a question of cost.

By way of example the accompanying drawings illustrate a form of "butchering" apparatus which may be adopted.

Fig. 1 is a side view, Fig. 2 an end view, and Fig. 3 a plan view of the apparatus.

Fig. 4 is a diagrammatic view of the eye punches and a manual control, while Fig. 5 illustrates an arrangement whereby varying interocular distances are accommodated.

Figure 3:
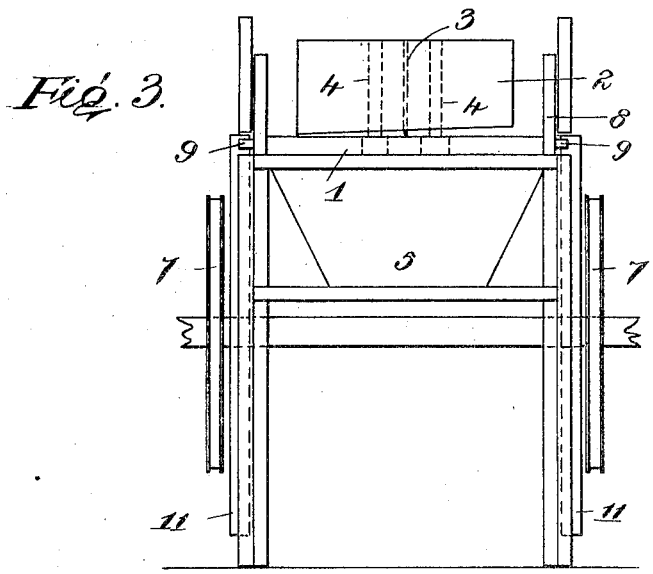

Referring to Figs. 1, 2 and 3, a travelling feed band 1 carries the products, for example, the heads, forward to the cutters 2, 3, and punches 4. The cutters 2 remove the jaws and teeth and the punches 4 remove the eyes. The cutter 3 opens or splits the heads so as to lie flat. The gills and mouth may be removed before placing the head on the band or the cutters 2 or supplementary cutters may perform this operation. Suitable devices for operating the cutters and punches in timed relationship with the feed may be embodied, or the cutters and punches may be operated by hand.

From the punches and cutters the rejects from the heads pass into a shoot 5, while the opened or split trimmed heads are fed forward to a delivery band or table 6.

Any convenient form of drive may be used, that shown by way of example comprising a chain drive 7 between the driven and follower shafts.

The feed band may have mounted thereon trays or receptacles 8 for the reception of the products, the trays or receptacles 8 having studs or projections 9 engaging teeth 10 on a disc or wheel 11 on the driving shaft. The follower disc 11$^a$ is also provided with a toothed disc corresponding to 10.

Figure 4:
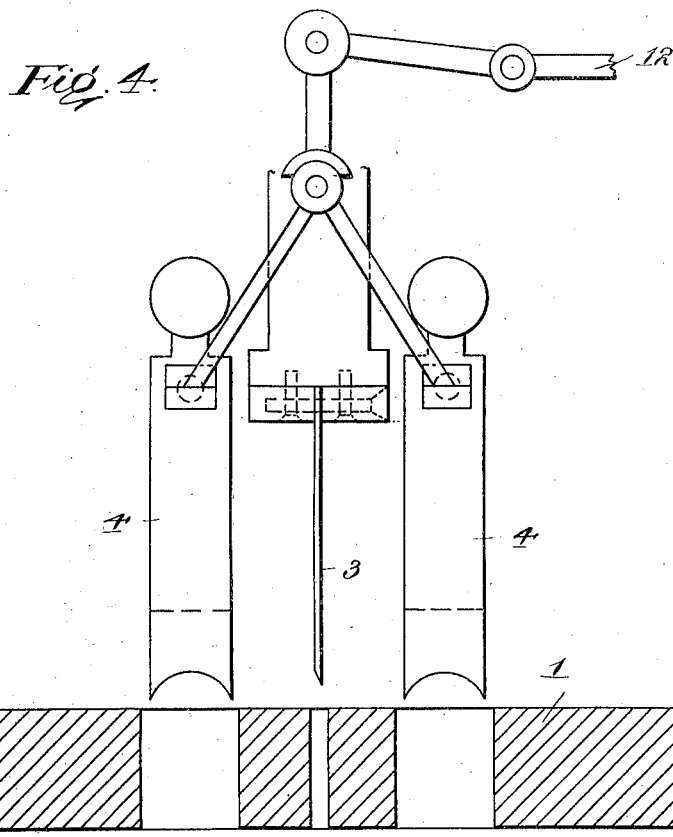

In Fig. 4 is shown an arrangement whereby the punches and cutters are under a manual control 12.

Fig. 5 illustrates an arrangement whereby varying interocular distances are accommodated. The feed carrier or tray has a range of holes 14, each hole having a separate co-operating plunger so that the head when brought beneath the plungers rests with the eyes in alignment with one or the other pairs of holes and the particular plungers for the effective pair of holes are then operated for removing the eyes. The setting of the range of holes is such that interocular distances occurring between heads of a normal grown fish are accommodated. The holes and punches may in a variant arrangement be under a control as to allow of movement so as to be brought into alignment with the eyes of the particular head being operated upon before the punching is carried out. Otherwise the control may be automatically effected.

Having now particularly described and ascertained the nature of my said invention, and in what manner the same is to be performed, I declare that what I claim is:—

In apparatus for butchering the head of a fish the combination of cutters for removing certain rejected parts of the head, plungers for removing the eyes, and means for splitting open the head.

In testimony whereof, I affix my signature.

PETER BURD JAGGER.